(No Model.)  
R. B. DASHIELL.  
BREECH LOADING ORDNANCE.
No. 544,637. Patented Aug. 13, 1895.
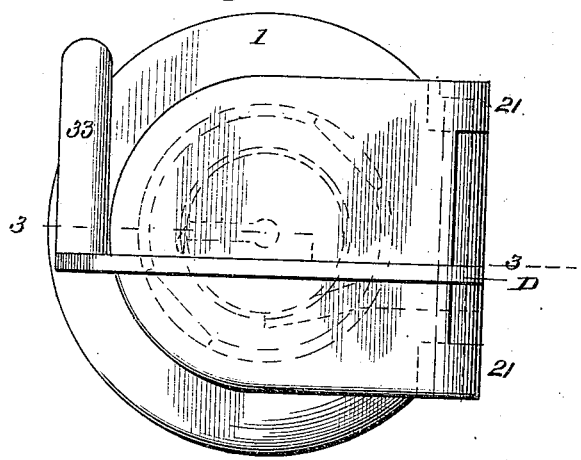
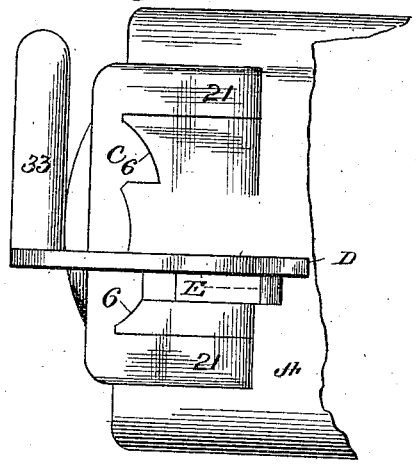
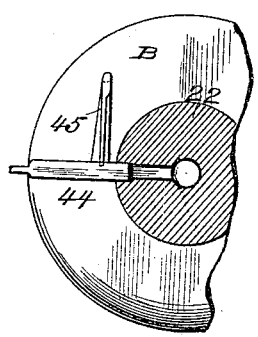
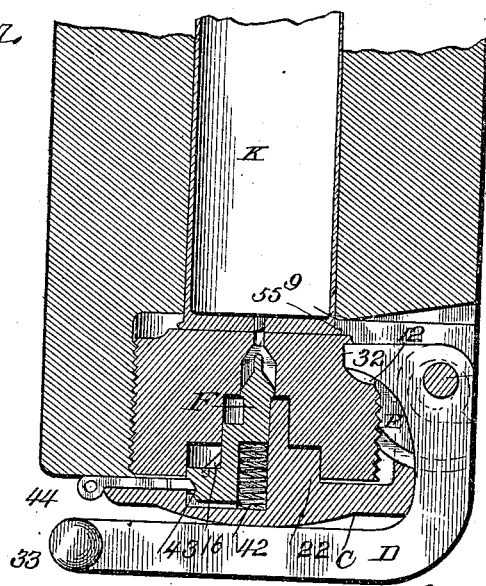
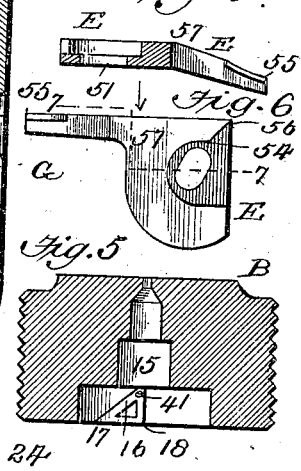
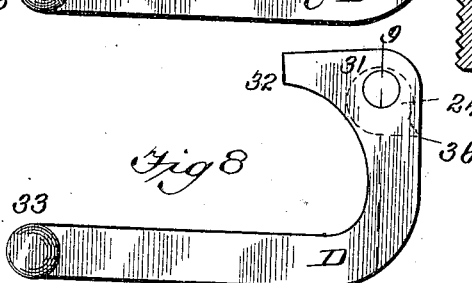
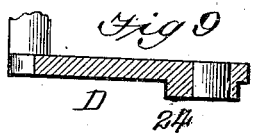
Witnesses  
John Imrie  
C. K. Davies
Inventor  
R. B. Dashiell  
By W. A. Bartlett  
Attorney

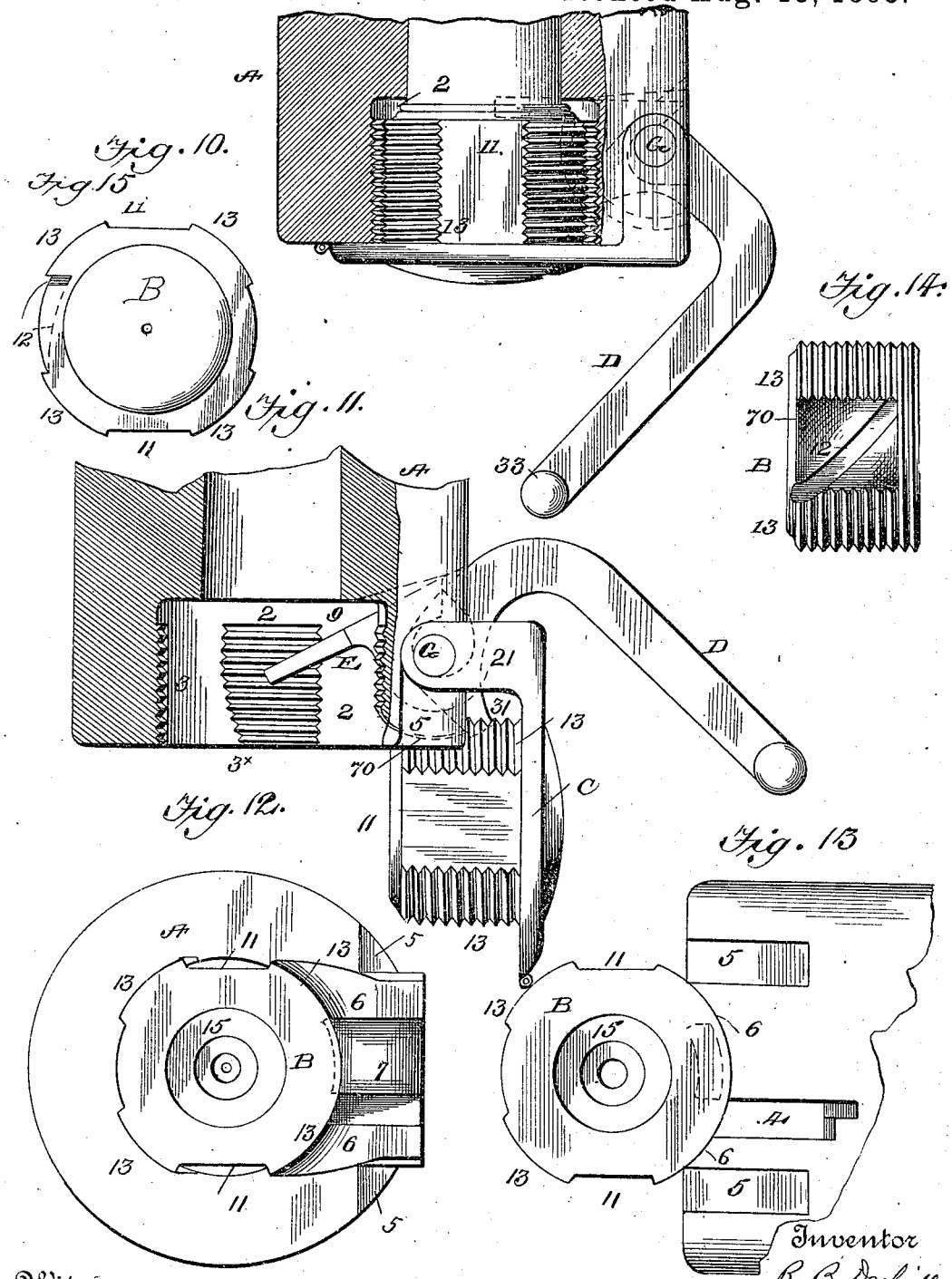

(No Model.) 4 Sheets—Sheet 3.

R. B. DASHIELL.
BREECH LOADING ORDNANCE.

No. 544,637. Patented Aug. 13, 1895.

Witnesses
C. K. Davis
J. W. Johnson

Inventor
R. B. Dashiell
By W. A. Bartlett
Attorney (No Model.)

R. B. DASHIELL.
BREECH LOADING ORDNANCE.

No. 544,637. Patented Aug. 13, 1895.

Witnesses
Percy C. Bowen
Chas. K. Davies

Inventor
R. B. Dashiell
By W. A. Bartlett
Attorney

UNITED STATES PATENT OFFICE.

ROBERT BROOKE DASHIELL, OF THE UNITED STATES NAVY, ASSIGNOR TO THE DRIGGS ORDNANCE COMPANY, OF WASHINGTON, DISTRICT OF COLUMBIA.

BREECH-LOADING ORDNANCE.

SPECIFICATION forming part of Letters Patent No. 544,637, dated August 13, 1895.

Application filed April 9, 1895. Serial No. 545,102. (No model.)

*To all whom it may concern:*

Be it known that I, ROBERT BROOKE DASHIELL, of the United States Navy, residing at Washington, District of Columbia, have invented certain new and useful Improvements in Breech-Loading Ordnance, of which the following is a specification, reference being had therein to the accompanying drawings.

This invention relates to breech-loading ordnance.

The object of the invention is to simplify the construction of rapid-fire guns; also to make the breech mechanism compact and of few parts; also to swing the breech-block of a mutilated-screw breech-gun to one side of the bore of the gun without first retracting it in line with the bore; also to improve the extractor and firing mechanism, and in various ways to improve the operating parts and combinations of mechanisms of the general character hereinafter described.

My invention is herein described in the best form known to me, but is capable of modification in many respects without departing from the spirit of my invention.

It will be understood that I do not in general confine myself to the forms and proportions shown, save as particularly specified in the claims.

Figure 16:
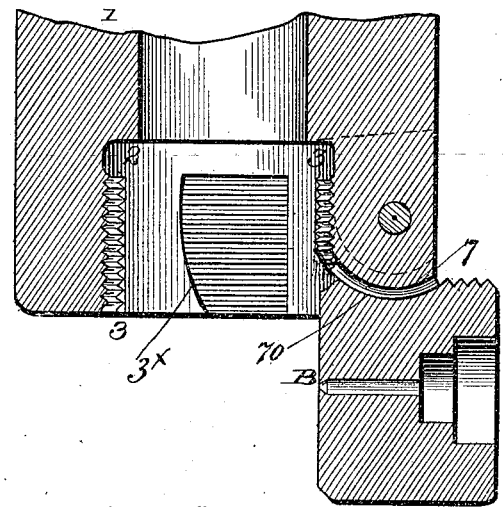
Figure 17:
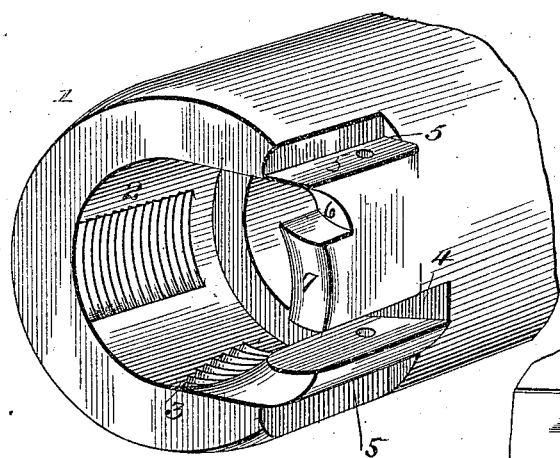
Figure 19:
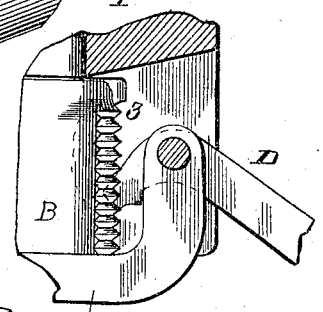
Figure 18:
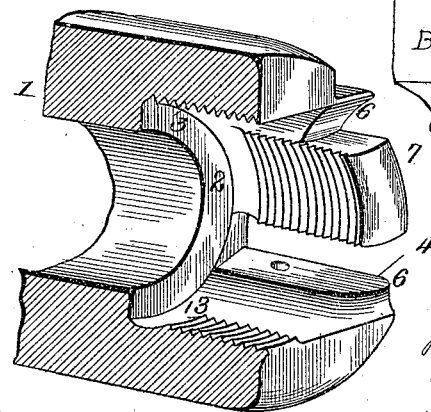
Figure 20:
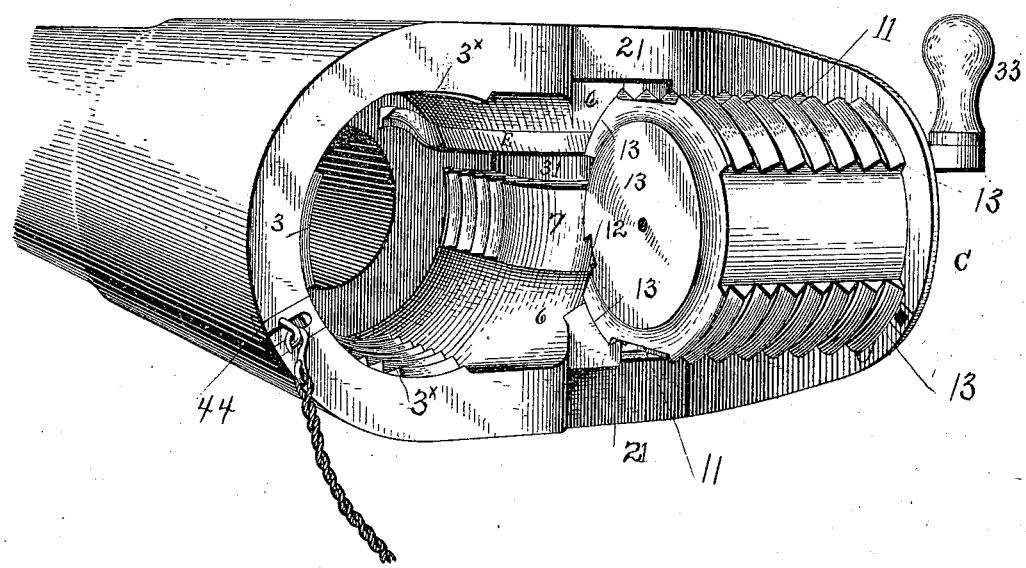
Figure 21:
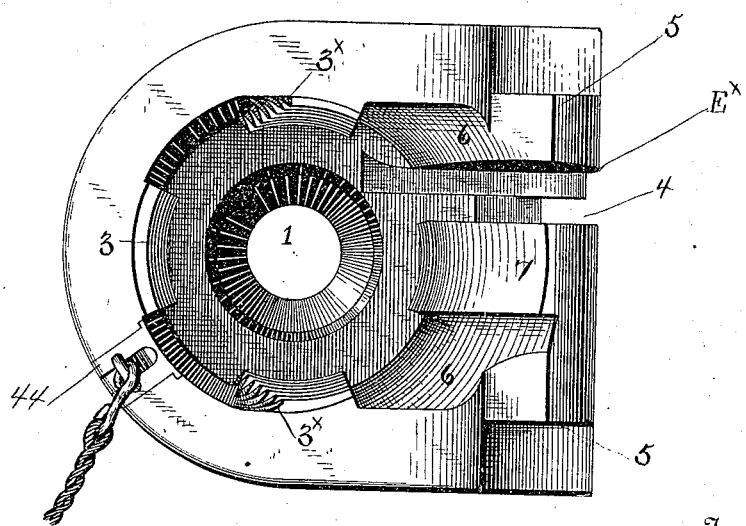

Figure 1 is a rear elevation of the breech of a gun according to this invention. Fig. 2 is a side elevation of the breech portion of the same gun. Fig. 3 is a section of the breech of a gun, showing the breech mechanism, partly in plan and partly in section, on line 3 3 of Fig. 1. Fig. 4 is a broken elevation of breech-plug and firing-pin retractor, showing hub of carrier in section. Fig. 5 is a cross-section of breech-plug. Fig. 6 is a plan, and Fig. 7 a partial section and partial elevation, of the cartridge-extractor on line 7 7 of Fig. 6. Fig. 8 is a plan, and Fig. 9 a section on line 9, of the operating-lever. Fig. 10 is a broken horizontal section with breech-plug in plan, breech partly unlocked. Fig. 11 is a similar broken section with breech open. Fig. 12 is a rear elevation of the gun and breech-block with breech-block carrier and other parts omitted. In Figs. 1, 2, 12, and 14 the gun is shown as modified by having a projecting part between the arms of the carrier. In other figures this projection is omitted. Both constructions are feasible. Fig. 13 is a side view of same parts, showing relative position of breech-block to gun when in open position. Fig. 14 is a side elevation of breech-block, and Fig. 15 a front view of the breech-block. Fig. 16 is a horizontal section of the rear part of the gun-body and breech-block open, other parts being omitted, the block slightly out of contact with the gun. Fig. 17 is a rear perspective of the rear portion of the gun. Fig. 18 is a vertical longitudinal section of the breech part of the gun, shown as in perspective. Fig. 19 is a broken horizontal section of breech part, showing engagement of operating-lever with the carrier as well as the breech-block. Fig. 20 is a rear perspective of the gun and breech mechanism slightly modified to carry the lever and extractor above the center. Fig. 21 is a rear-end perspective of this modification of the gun-body.

The gun-body is of any usual material, either solid or built up. The breech-block chamber 2 is provided with screw-threads in segments 3 3, each segment being about one-eighth of the circumference and being at top and bottom and at the sides of the breech-plug chamber.

The mutilated-screw breech-plug B is of generally cylindrical form and has plane faces 11, which are at the top and bottom when the block is in unlocked position in the breech-block chamber. The block has segmental threads 13 13, each segment covering about forty-five degrees of its circumference, these segments being complementary to those in the wall of the chamber 2, so that when the breech-plug is entered from the rear a rotation through an arc of forty-five degrees will completely interlock the segmental threads of the breech-block with those of the gun. One of the blank curved faces of the breech-plug has an inclined or cam groove 12, in which the operating-lever moves to cause this partial rotation, as will be described, and the threads may be continuous at the outer end of this blank space. The breech-plug has a central cylindrical chamber 15 for the reception of the hub on the carrier and the firing-pin. The plane horizontal faces of the breech-block permit the block to swing sidewise over the top and bottom segments of threads in the gun.

The side wall of the breech-plug chamber is slotted, as indicated at 4, (see Fig. 13,) for the reception of the operating-lever; and has recesses 5 5, in which the hinge-arms of the carrier are pivoted.

The rear wall of the breech-block chamber is cut away, as by a cylindrical cutter of the maximum cross-section of the breech-plug, moved in the arc of a circle about the center G, from which the plug swings, producing concave surfaces, as indicated at 6 6, Fig. 13, so that when the breech-block is swung to the side it will lie partially in a recess in the breech of the gun.

The recess 6 in the rear of the gun has a guiding-face 7, which enters between two of the projecting segments 13 on the breech-block and prevents the rotation of the breech-block while swinging sidewise with its carrier. The guiding-face 7, as indicated in full lines, Fig. 3, and in dotted lines, Figs. 10 and 11, is on a curve struck from the center G, on which the breech-block carrier turns in opening or closing the breech. The blank face 70 of the breech-block, which is adjacent to this guiding-face 7 in opening and closing, is also formed on a curve complementary to that of the guiding-face 7, (see dotted lines, Fig. 11,) so that in swinging to open or closed position the guide-face 7 on the gun, facing nearly toward the breech end of the gun, serves as a support, against which the cut-away part 70 of the breech-block rides smoothly.

When not supported by the gun, the breech-block is supported by the breech-block carrier C, which, as shown in the drawings, has arms 21 extending forward from the carrier into the recesses 5 in the gun, where the arms are pivoted to the pintle G, nearly as far forward as the front of the breech-block when closed.

The breech-block B is swiveled to the carrier C, preferably on a hub or projection 22 from the carrier entering the axial chamber 15 of the breech-block, so that the block may rotate on its own center by turning on said hub when supported by the carrier.

The carrier C has a broad face toward the rear of the gun, which projects beyond the edges of the breech-block and effectually covers all joints and serves to exclude dust from the closed breech.

The construction and relation of the carrier, breech-block, and gun are such, as indicated in Fig. 11, that when the carrier is swung out and the breech open the breech-block is supported by the carrier, but in close contact with the rear of the gun, and two segments 13 of the breech-block embrace the upper and lower edges of the projection provided with the guide-face 7 on the gun, so that the breech-block cannot rotate on its center. The contact of faces 7 and 70 may be made to prevent the rotation of the block whether the segments overhang the guide-face 7 or not, and by this contact a close joint is secured, preventing the entrance of dust. The construction is very compact and durable.

The guide-face 7 may be in part cut away by slot 4 to make room for the operating-lever or extractor, or both. The parts will then be so constructed as to restore the symmetry of the whole and preserve the functional relation of the breech-block to the gun-body. The rear end of the gun may be recessed, as at E, to receive the extractor.

The upper and lower mutilated screw-segments 3 are cut away slightly toward the rear of the gun, as at 3ˣ, in the arc of the swinging movement of the breech-block B, the ends of the threads then presenting curved bearing or guiding shoulders, against which the thread-segments of the plug will find bearing during the swinging movement of the plug, thus permitting the swinging movement of the breech-block in opening to begin as soon as the screw-threads are unlocked, or without drawing the breech-block directly to the rear, as in the common form of mutilated-screw breech-block. The strength of material lost by this cutting away of segments 3 is very slight. The reverse construction, whereby the segments of the breech-block may be struck from the curves of the swinging movement of the block, is considered an equivalent. The hand-lever D is also pivoted on the pintle G and within the slot 4 in the gun-wall. This lever is a bell-crank and has an arm 31, extending through the slot 4, terminating in a toe 32, which enters the cam-groove 12 in the breech-block. The lever D will have a suitable operating-handle, as 33, which may be of any approved form.

The cam-groove 12 extends obliquely or spirally from near the front of the breech-block toward the rear, and is also shown (dotted lines, Fig. 10) as cut away in a curve in longitudinal direction, which is calculated from the center G, so that the toe 32 of the lever may fairly fit the slot.

When the breech is closed, as in Fig. 3, the toe 32 of the operating-lever is at the front end of cam-groove 12. By swinging the lever D backward its toe 32 moves along the cam-groove 12, and as the interlocking screw-threads prevent the breech-block from moving directly backward the block will turn on its center until the segmental threads are unlocked, the toe moving in an arc around its pintle G. At the completion of the unlocking movement two of the segments 13 on the breech-block are in alignment with the upper and lower faces of the guide-surface 7, and preferably the toe 32 will have reached a bearing at the end of slot 12. A continuation of the swinging movement of lever D carries the toe 32 toward the side of the gun and swings the breech-block in its carrier to open position, Fig. 11, the breech-block being supported by the carrier when so swung open. The arm 31 may strike the carrier at about the instant of completing the rotation of the breech-block.

In closing the breech, the block being prevented from rotation by the engagement of the segments 13 or face 70 with guide 7, as described, a backward pull or swing of the handle 33 in usual manner first swings the block and carrier to nearly closed position, and then partly rotates the block on its center to engage the segmental threads.

As the breech-block has practically no direct longitudinal movement the mechanism is very compact, and as the usual backward movement of the breech-block is dispensed with great rapidity of movement is had.

The firing-pin F is carried in a recess in the hub 22 of the carrier and has a pin 41, which enters the groove 16 in the breech-block. This groove 16 is a triangular cam-groove, as shown in Fig. 5. When the breech-block rotates on its axial center, as the firing-pin is held from rotation by the hub of the carrier, the inclined side of groove 16 moves along the pin 41, thus forcing the firing-pin backward against the resistance of spring 42, which spring has its bearings against the carrier and a shoulder or offset on the firing-pin.

The firing-pin F has a notch 43 at one side, and the trigger or sear 44 is pressed toward the firing-pin by a spring, as 45. (See Figs. 3 and 4.) When the firing-pin has been drawn back by the rotation of the breech-block, as described, the pin will be caught by trigger 44 and held in cocked position. Even if the trigger should be released the firing-pin could not move forward while the pin 41 is opposite the shoulder 17 on the breech-block; but on closing and locking the breech the straight slot 18 is brought in line with the projection 41 of the firing-pin, and then a movement which disengages the trigger 44 from the firing-pin permits spring 42 to drive the firing-pin forward, and in this manner the gun is fired. The trigger 44 may be pulled by a lanyard or in any other convenient manner.

The extractor E is pivoted in the slot 4, preferably below the operating-handle. The opening 51 in the extractor, through which pintle G passes is oblong, to permit a lever-movement of the extractor across the fulcrum 9 in the wall of the gun. The lever D has a cam or abutment 24, which engages a jaw 54 on the extractor as the lever is swung to the rear. This cam rocks the extractor on its fulcrum 9 and forces back the cartridge-shell K, with which the nib 55 of the extractor engages with a powerful leverage while the breech-block is starting rearward. When the breech-block has moved to one side far enough to be out of the way of the shell, the toe 36 of the lever strikes abutment 56 of the extractor, and the entire weight of the breech-block and carrier then acts to rock the extractor quickly on the pintle G and throw the shell backward. A reverse movement of the lever rocks the extractor forward by means of the cam engagement between the lever and the extractor. The bar 57 of the extractor can be made elastic, so that the extractor will spring under the flange of a shell already in the gun, as is common with extractors for small-arms.

As the breech-block is somewhat larger than the head of the cartridge, the cartridge-head is fully covered when the breech is closed, while the plane faces on the block permit the swinging retraction with less cutting away of the gun than would otherwise be the case. The plane faces of the breech-block permit the swinging movement of the block with its carrier immediately after the block is unlocked.

Changes of detail and modification of parts can be made by the exercise of usual mechanical skill without departure from the real invention.

The pintle may be readily connected to the operating-lever by a key and made to operate a supplementary extractor or extractors by cams or otherwise.

I am aware that frusto-conical breech-plugs on the mutilated-screw system have been made to swing open on a pivoted carrier from closed (but unlocked) position. The frusto-conical form of breech-block permits this; but there are practical difficulties in the way of construction of frusto-conical breech mechanism which make that form objectionable in many instances.

I am also aware that a cylindrical breech mechanism of the mutilated-screw form has been devised wherein the breech-plug has but two thread-segments and flattened sides, in which the plug swings open through a slot in the side of the gun. This form has some objections on account of the considerable cutting away both of gun and breech-plug.

I am familiar with ordnance as constructed in this and other countries, and am aware that nearly every system has its own advantages and disadvantages. The system I have devised and described above removes some objections heretofore existing without, so far as I am aware, adding others, and I believe it to be a marked improvement, especially in rapid-fire guns.

What I claim is—

1. In breech loading ordnance, the gun body having a curved bearing-face, as described, the breech block carrier, and the breech block swiveled to said carrier and in contact with the curved bearing face on the gun while swinging to open or closed position, all combined substantially as described.

2. In breech loading ordnance, the gun body having a curved guiding surface at its rear, the swinging breech block carrier connected to the gun, and the mutilated screw breech carried by said carrier, and having shoulders engaging said guiding surface to prevent the rotation of the breech while the carrier is swinging on its pintle, in combination substantially as described.

3. In a breech loading gun, the recessed body, the cylindrical breech block chamber having four cylindrical segments of screw-threads arranged respectively at the top and bottom and opposite sides of said chamber, the generally cylindrical breech plug swiveled to a carrier and having four segments of screw-threads complementary to those of the gun, and having an inclined or cam groove in one side of the body of the plug and extending nearly to the front of said plug, and the operating lever pivoted in the recess in the gun body and extending into the cam groove in the plug, all combined substantially as described.

4. The combination of the gun and the breech block, each having interrupted screw segments, of two segments on opposite sides cut away on curves struck from the pivotal center on which the block turns in opening and closing, the corresponding segments on the block and gun engaging on these curved faces as the block swings about said pivotal center, substantially as described.

5. The combination with the recessed gun and its mutilated screw breech plug having a cam groove near its front and extending along the side of the plug, of the carrier, on which carrier the breech-plug is swiveled the operating lever pivoted in the recess in the gun and having a toe extending from its forward end into the cam groove of the plug, all substantially as described.

6. In breech loading ordnance the combination with the mutilated screw breech block and the pivoted carrier to which said block is swiveled, of the operating lever pivoted to the gun and having direct engagement with the breech block to rotate the same, and a guide surface on the gun engaging the breech block substantially as described to prevent rotation of the breech block while swinging with its carrier, as set forth.

7. In breech loading ordnance, the gun, having a curved bearing surface facing generally toward the rear, the breech block carrier pivoted to the gun, and the breech block swiveled to the carrier and having a bearing against the said bearing surface on the gun during the swinging movement of the carrier, all combined substantially as described.

8. The gun having a curved bearing face at its rear, the breech block carrier pivoted to the gun, the breech block swiveled on said carrier, and the operating lever pivoted to the gun and engaging said breech block and carrier, all combined substantially as described.

9. In breech loading guns, the combination of the recessed gun body having thread segments therein cut away on arcs struck from the center of swinging movement of the plug, so as to have end bearing shoulders, the breech plug having a cam groove in one side, and the lever pivoted in the recess of the gun and having one end extending into the cam groove of the block, all substantially as described.

10. The gun having a slot in its side, the carrier and operating lever hung on a pivot, and the breech block swiveled to said carrier and having a cam groove in its side, and extending nearly to the front thereof so as to be within the walls of the gun when the breech plug is closed, the toe of the lever extending through the slot in the gun and engaging the said groove in the breech block, all combined substantially as described.

11. The breech block having a cam groove in its side said groove extending in a curve struck from the pivot of the operating lever, the lever pivoted to the gun and having its toe entering said groove, and the carrier pivoted to and all combined with the gun, substantially as described.

12. In breech loading ordnance, the gun, the extractor having a fulcrum on, and said extractor bearing directly against the body of said gun, and a bearing surface on the breech mechanism engaging said extractor to turn the same on its fulcrum as the breech opens.

13. In breech loading ordnance, the gun, breech block, and operating lever, the extractor pivoted in the breech and having a fulcrum on the gun proper, and the operating surfaces on the lever engaging the extractor to first rock it on its fulcrum and then turn it on its pivot, all combined substantially as described.

14. In breech loading ordnance, the combination with the gun, of the extractor loosely pivoted thereto and having a fulcrum thereon, and the breech operating mechanism engaging the extractor as described to first rock it on its fulcrum and then turn it on its pivot and away from the fulcrum, all substantially as described.

15. In breech loading ordnance, the combination of the gun and its breech block, the operating lever pivoted to the gun, the cartridge extractor loosely pivoted on same pintle as the lever, and having a fulcrum against the body of the gun and the cam and shoulder on the lever engaging the extractor (to first rock the extractor on its fulcrum and then turn it on its pivot) all substantially as described.

16. The gun having a mutilated screw breech seat, and a convex bearing surface at its rear on a curve struck from the center of the swinging movement of the breech in opening and closing, combined with the breech block having a corresponding bearing surface between its screw-segments, and a suitable carrier, all substantially as described.

17. The breech block for ordnance having segmental threads substantially as described, plane faces on opposite sides between the segments, and a curved face having an operating cam thereon said faces being at right angles to the plane faces, and between the segments, substantially as described.

18. The breech block for ordnance having segmental threads substantially as described, plane faces on opposite sides between the segments, a curved face between two of the segments, and means for moving said breech in the gun, in combination, substantially as described.

19. In breech loading ordnance, the combination with the gun and a breech block carrier pivoted thereto, of the mutilated screw breech block on said carrier having a side cut away longitudinally in a curve drawn from the pivotal support of the carrier.

20. In breech loading ordnance, the gun, the breech block carrier pivotally connected thereto and having a closed rear face piece covering and projecting beyond the edges of the breech block, which block is swiveled thereto, all combined substantially as described.

21. In breech loading ordnance, the gun, the carrier having a central hub projecting therefrom, said hub having a slot therein, the firing pin and spring in said slot, the breech block swiveled on said hub and having a cam to engage the firing pin to cock the same, and a trigger or sear engaging said firing pin, substantially as described.

22. The combination with the gun and the carrier having a central hub and the breech block swiveled thereon, of the firing pin and spring in a recess in said hub, the cocking cam on the breech block, the trigger engaging a notch in the side of the firing pin, and the spring acting against said trigger, all combined substantially as described.

In testimony whereof I affix my signature in presence of two witnesses.

ROBERT BROOKE DASHIELL

Witnesses:
CHAS. L. DU BOIS,
W. A. BARTLETT.